United States Patent
Cohen et al.

(10) Patent No.: US 6,463,397 B1
(45) Date of Patent: Oct. 8, 2002

(54) ENVIRONMENTAL MONITORING AND CONTROL SYSTEM FOR A VENTILATED CAGE AND RACK SYSTEM

(76) Inventors: Adam Cohen, 11 Cornell St., Worcester, MA (US) 01602; Josh Tang, 7 Tucker St., Pepperell, MA (US) 01463

( * ) Notice: Subject to any disclaimer, the term of this patent is extended or adjusted under 35 U.S.C. 154(b) by 0 days.

(21) Appl. No.: 09/706,516

(22) Filed: Nov. 6, 2000

Related U.S. Application Data (60) Provisional application No. 60/164,028, filed on Nov. 5, 1999.

(51) Int. Cl.[7] .............................. G01N 7/00; G06F 15/00
(52) U.S. Cl. ..................... 702/140; 700/276; 700/277; 454/238
(58) Field of Search ............................ 702/33, 36, 45, 702/47, 50, 113, 114, 138, 140, 182–185, 188; 700/276, 277, 282, 301; 454/239, 256; 119/417, 418

(56) References Cited

U.S. PATENT DOCUMENTS

| | | | | |
|---|---|---|---|---|
| 3,915,377 A | * | 10/1975 | Sutton, Jr. ................. 236/49.1 |
| 4,085,705 A | * | 4/1978 | Gland et al. ................. 119/418 |
| 4,700,887 A | * | 10/1987 | Timmons ..................... 236/49.3 |
| 4,986,469 A | * | 1/1991 | Sutton, Jr. ................... 236/49.3 |
| 5,125,571 A | * | 6/1992 | Heber ......................... 236/49.3 |
| 5,301,126 A | * | 4/1994 | Nishimura et al. ............. 702/45 |
| 5,333,783 A | * | 8/1994 | Catan ........................... 236/13 |
| 5,520,328 A | * | 5/1996 | Bujak, Jr. ................... 236/44 A |
| 5,538,471 A | * | 7/1996 | Guiles, Jr. .................... 454/238 |
| 5,951,394 A | * | 9/1999 | Pariseau ........................ 454/61 |

\* cited by examiner

*Primary Examiner*—Marc S. Hoff
*Assistant Examiner*—Manuel L. Barbee
(74) *Attorney, Agent, or Firm*—Stroock & Stroock & Lavan LLP (57) ABSTRACT

An environmental monitoring and controlling system for a ventilated cage and rack system that monitors and measures air flow in the rack at either the rack or cage level. At the rack level, two pressure sensors are provided in a supply air system to accurately monitor the air flow rate into the rack. In addition, two pressure sensors may be provided in an exhaust air system to accurately monitor the air flow rate out of the rack. At the cage level, a cage may be equipped with a highly accurate pressure sensor, including a Venturi tube and thermistor, the monitor the air flow rate in a cage located at any cage position in the rack.

18 Claims, 7 Drawing Sheets

ENVIRONMENTAL MONITORING AND CONTROL SYSTEM FOR A VENTILATED CAGE AND RACK SYSTEM

CROSS-REFERENCE TO RELATED APPLICATION

This application claims priority from U.S. Provisional Patent Application Ser. No. 60/164,028, filed on Nov. 5, 1999.

FIELD OF THE INVENTION

The present invention is directed to rack-level and cage-level environmental monitoring and control in a ventilated cage and rack system.

BACKGROUND OF THE INVENTION

It is well-known in the art to house laboratory animals, such as mice and rats, in cages. It is also well-known in the art to house the cages on racks. These cages are typically ventilated and, when placed in a rack, environmentally controlled (e.g., air-flow and air-exchange rate) by a fan system of the rack. In general, the rack fan system provides air under pressure to each of the cages within the rack, and exhausts air from the cages and the rack, as is known in the art.

While prior art ventilated cage and rack systems have been satisfactory, the air within the cage must be changed, or refreshed, on a periodic basis to prevent ammonia build-up, humidity build-up, carbon monoxide build-up, or the build-up of other potentially harmful gases, which may have an adverse effect on the animal within the cage. Changes in temperature in the cage and rack system must also be monitored and controlled to protect the animals housed in the cages. Although the prior art ventilated cage and rack systems did put the cages under positive pressure to create air flow through the cage, those systems do not have the capability to monitor and maintain the desired air flow within the cage and rack or to otherwise monitor and control the environment in the cage and rack. Typically, the supply air system is set for a predetermined air flow rate into the rack, and the exhaust air system is set at a maximum air flow rate. Such a configuration does not adjust air flow into and out of the system as the input and exhaust filters clog, which always occurs. Thus, current rack and cage ventilation systems cannot provide rack and/or cage-level control of the environment in the rack and/or cages. There thus exists a need in the art for a system for monitoring and controlling the air flow within the rack and to the cage at both the rack level and cage level.

SUMMARY OF THE INVENTION

The present invention is directed to an environmental monitoring and controlling system for a ventilated cage and rack system. The present invention monitors and measures air flow in the rack at either the rack or cage level. At the rack level, two pressure zones are created in the air flow that provide a means to accurately measure the flow rate into the rack. The two zones are created in such a way as to minimize the energy loss of the flow. At the cage level, a specially designed Venturi used in conjunction with a heated thermistor bead accurately measures the flow rate into an individual cage and to monitor the air flow rate in a cage located at any cage position in the rack. The method of measuring the flow in this case differs from that of the rack due the fact the flow is on the order of being 100 times less.

For example, the cage may be located in a position known to experience the lowest air change per hour rate. Control of the supply air system may thus be effected by the cage and determined by the air flow rate (i.e., air change per hour rate) detected at the cage level. Control of air flow into the rack, whether at the rack-level or cage-level is accomplished by comparing measured air flow data (measured at the supply or cage) with a desired air flow rate (which translates to a desired air exchange rate for the rack and/or cage). Based on that comparison, the operation of the supply air system, namely, the rotational speed of the fan, is controlled so as to achieve the desired air flow rate. Similarly, the exhaust air system monitors and measures the exhaust air flow rate and compares that rate against a predetermined exhaust air flow rate. Operation of the exhaust air system is adjusted so as to provided that desired exhaust air flow rate.

In a first embodiment of the present invention, a system for monitoring and controlling the rack-level environment includes a supply air system for detecting and controlling the air flow rate into the rack, and an exhaust air system for detecting and controlling the air flow rate out of the rack. Each of the supply air system and exhaust air system are similarly constructed, and include a Venturi housing having an air channel defined therethrough. For the supply air system, a first section of the Venturi housing has a larger diameter than a second section, with the second section constricting air flow through the air channel and causing an increase in the velocity of air flow through the Venturi housing. A first pressure zone (detector) is provided in the first section, and a second pressure zone (detector) is provided in the second section. That placement of the two pressure zones, together with the use of a Venturi housing, enables an accurate determination of the air flow rate (which is directly related to the air exchange rate of the rack) using inexpensive pressure detectors. In a preferred embodiment, the pressure zones are apertures in the housing connected to a differential pressure circuit via two tubes. That circuit receives pressure data from the pressure zones and determines a difference between two pressures, which provides an accurate indication of the air flow rate (and air exchange rate) in the rack. The differential pressure circuit provides a signal indicating the air flow rate to a microcontroller circuit, which provides a signal to a fan interface circuit that controls the rotational speed of a fan located at the input of the Venturi housing and which controls air flow into the system.

In a similar manner, the exhaust air system includes a Venturi housing having two pressure zones provided in the air flow path for detecting air pressure at two points along that path. The detected pressures are again provided to a differential pressure circuit, which provides a signal indicating the air flow rate through the exhaust air system to a microcontroller circuit, which provides a signal to a fan interface circuit that controls the rotational speed of a fan located at the output of the Venturi housing and which controls air flow out of the system.

In another embodiment of the present invention, rack-level environmental monitoring and control is provided only by a supply air system, as described above and in more detail below.

In yet another embodiment of the present invention, cage-level environmental monitoring and control are provided. A Venturi tube is provided in a dummy cage (i.e., one that is not used to house an animal) and coupled to a controller that monitors the air flow rate through the Venturi tube (using a thermistor), and provides feedback to a rack-level control system to control the supply air system and, in effect, air flow at the cage level.

The present invention accordingly comprises the features of construction, combination of elements, arrangement of parts, which will be exemplified in the disclosure herein, and the scope of the present invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to an environmental monitoring and controlling system for a ventilated cage and rack system. The present invention monitors and measures air flow in the rack at either the rack or cage level. At the rack level, pressure in a supply air system is measured at two pressure points to accurately monitor the air flow rate into the rack. In addition, pressure may be measured at two pressure points in an exhaust air system to accurately monitor the air flow rate out of the rack. At the cage level, a cage may be equipped with a highly accurate flow sensor, consisting of a Venturi tube and thermistor, to monitor the air flow rate in a cage located at any cage position in the rack. For example, the cage may be located in a position known to experience the lowest air change per hour rate. Control of the supply air system may thus be effected by the cage and determined by the air flow rate (i.e., air change per hour rate) detected at the cage level. Control of air flow into the rack, whether at the rack-level or cage-level is accomplished by comparing measured air flow data (measured at the supply or cage) with a desired air flow rate (which translates to a desired air exchange rate for the rack and/or cage). Based on that comparison, the operation of the supply air system, namely, the rotational speed of the fan, is controlled so as to achieve the desired air flow rate. Similarly, the exhaust air system monitors and measures the exhaust air flow rate and compares that rate against a predetermined exhaust air flow rate. Operation of the exhaust air system is adjusted so as to provided that desired exhaust air flow rate.

Figure 1:
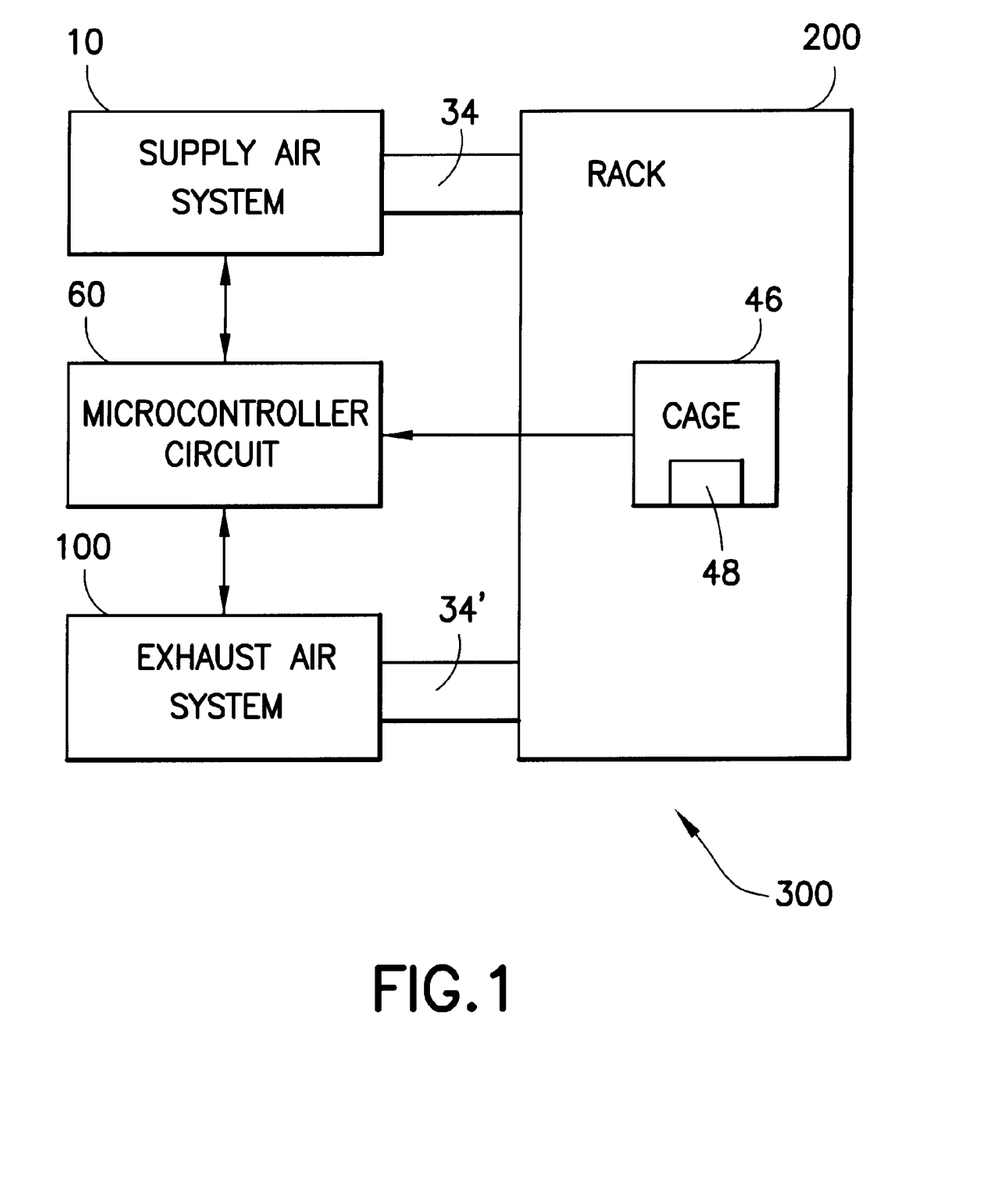
FIG. 1 is a block diagram of a system for monitoring and controlling the environment in a rack and constructed in accordance with an embodiment of the present invention.

Referring now to the drawings in detail, FIG. 1 depicts an embodiment of a system for monitoring and controlling the environment in a rack used to house a plurality of laboratory animals in a plurality of individual cages (not shown), and generally designated as 300. The system 300 includes a supply air system 10, an exhaust air system 100, both coupled for bi-directional communication with a microcontroller circuit 60. Each of the supply air and exhaust air systems 10, 100 are fluidly coupled to a rack 200 to respectively provide an supply (i.e., input) air flow to and an exhaust air flow from the rack 200 so as to control the environment within the rack 200 to ensure the safety and comfort of the animals contained within cages in the rack 200. The inventive monitoring and control system 300 advantageously provides a controlled and controllable environment within each cage and within the rack 200 by constantly monitoring the input air flow rate and exhaust air flow rate, and by comparing those rates to predetermined desired air flow rates (i.e., air change per hour rates), and by adjusting the operating of the supply air system 10 and exhaust air system 100 to ensure that the predetermined desired air flow rate is accomplished. A monitoring and controlling system 300 in accordance with the present invention preferably includes both a supply air system 10 and an exhaust air system 100, although either one may also be provided without the other.

Cage-level monitoring and control may also be provided in accordance with an embodiment of the present invention. A cage 46 having a Venturi tube 48 may be placed at any cage location in the rack 200 to detect the air flow rate through the cage 46 at that location. That detected air flow rate may be compared (by the microcontroller circuit 60, for example) with a desired air flow rate, and the supply air system 10 adjusted so as to control the air flow rate through the cages.

Figure 2:
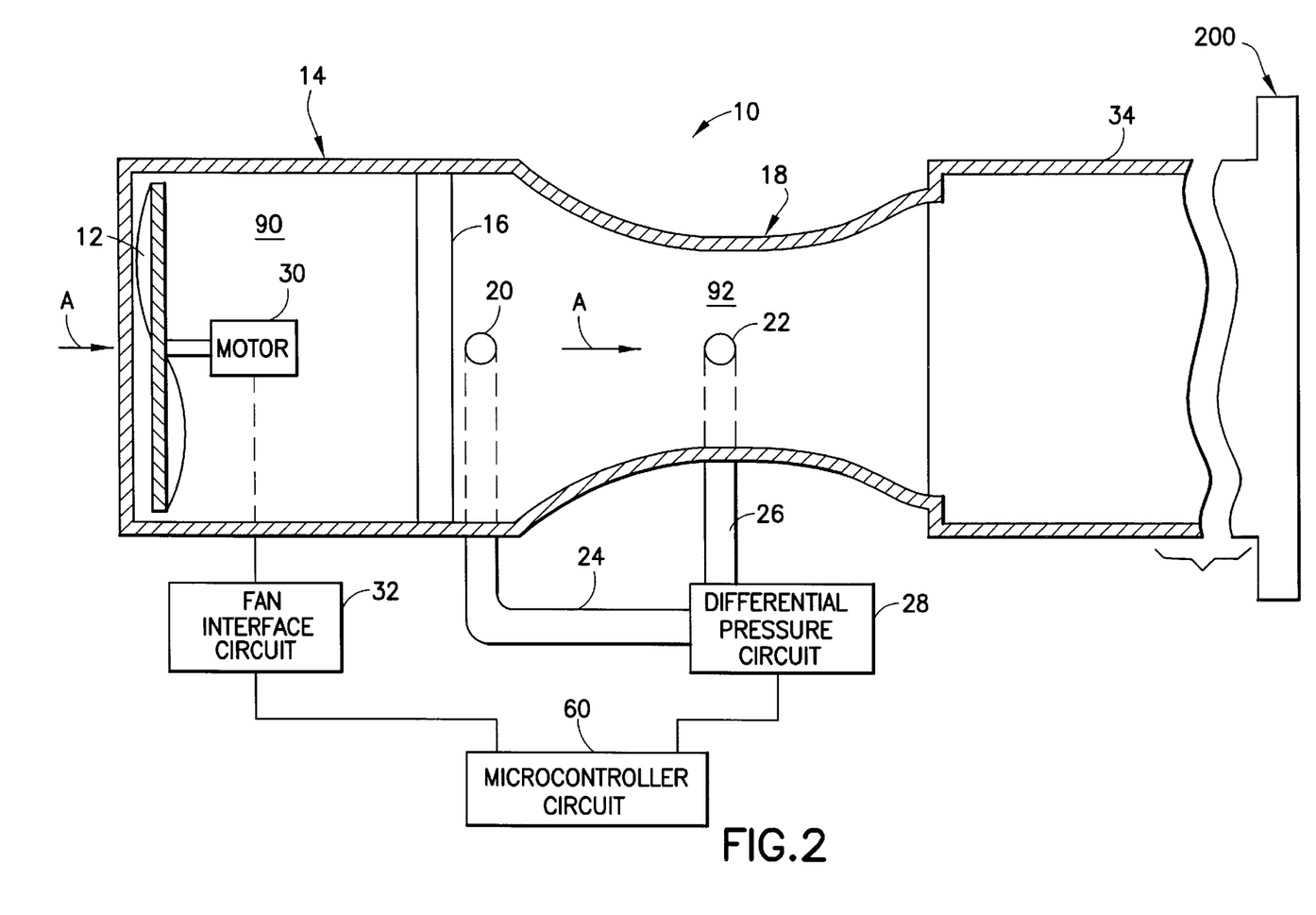
FIG. 2 is a cross-sectional side view of a supply air system of the system of FIG. 1 and constructed in accordance with the present invention.

Referring next to FIG. 2, the supply air system 10 includes a housing 14 generally configured so as to provide a Venturi effect to air flowing through the housing in an air flow direction as indicated by arrow A. A high pressure fan 12 is provided at an input of housing 14 to generate a supply or input air flow to the animal rack 200. High pressure fan 12 is driven by a motor 30 under the control of a fan interface 32 which electrically couples motor 30 to a microcontroller 60. The rotational speed of the fan 12, and control of the motor 30, are by the microcontroller 60 and fan interface circuit 32, as described in more detail below.

Housing 14 includes a Venturi tube 18 having a constricting section 92. A HEPA filter 16 for filtering incoming air is mounted in housing 14 in a receiving section 90 and between high pressure fan 12 and Venturi tube 18. The ratio (of cross-sectional area, for example) of the receiving section 90 to constricting section 92 is approximately 10:1, in a preferred embodiment. A first opening 20 is provided in housing 14 upstream of constricting section 92 (in the air flow direction) for detecting a first air pressure in the receiving section 90. A second opening 22 is provided downstream of the first opening 20 and in the constricting section 92 for detecting a second air pressure in the constricting section 92. A first tube 24 couples opening 20, and a second tube 26 couples opening 22, to a differential pressure circuit 28 which can compare the first and second air pressures and determine a difference, if any, therebetween. Venturi tube 18 enables the conditioning and monitoring of the air flow through the supply air system 10 and is dimensioned utilizing known mathematical formulas to maintain flow efficiency, such as provided in equation (1):

$$Q = (C_v A_2 / \sqrt{1 - (A_2/A_1)^2}) * \sqrt{2g(p_1/y - p_2/y)} \qquad (1)$$

Where Q is the flow rate, $A_2$ is the cross-sectional area of the smaller part of the Venturi tube, $A_1$ is the cross-sectional area of the larger part of the Venturi tube, $p_1$ is a pressure taken at the first pressure point, $p_2$ is a pressure taken at the second pressure point, $C_v$ is a calibration coefficient (where $0.95<C_v<1.0$ and related to Reynolds number), g is acceleration due to gravity, and y is the specific weight of air. This insures that the theoretical relationship between air pressure and air flow is optimized. In a preferred embodiment the Venturi is a 10-1 Venturi.

Since air is not stored or removed from the system 10, the same volume of air that passes through section 90 must also pass through section 92. Since the cross sectional area of 92 ($A_2$) is less than the cross sectional area of 90 ($A_1$), the air must travel at a faster rate in section 92 than in section 90. A pressure difference must exist between sections 90 and 92 in order to accelerate the air. This pressure difference is related to the flow rate as described by the equation above. The pressure is in effect read across the Venturi and provides an accurate measurement of air flow into the rack 200. Differential pressure circuit 28 outputs a signal corresponding to the pressure differential between opening 20 and opening 22 to microcontroller 60, which in turn outputs a signal through fan interface 32 to motor 30 to control the speed of motor 30 and high pressure fan 12 as is discussed in greater detail below. The air exiting from Venturi tube 18 passes through an air plenum or conduit 34 into the rack 200 and is distributed to each of the cages provided in the rack 200 in a generally art-recognized manner.

Air change within each cage is the desired effect for laboratory animal rack systems, such as the type discussed herein. Air change can be considered the rate at which the volume of air within the cage is changed; such as air changes per hour (ACH). Air changes per hour may be controlled if the volume of the cage is known. Once the volume of the cage is known, air changes per hour can be controlled by the amount of air over time which is forced into the cage, in other words, the air pressure into the cage. The speed of the supply and exhaust system fans control the rate at which air moves through the rack 200 and cages 46. Because the rack 200 has a fixed and determinable volume (determined, at least in part by the volume of the cages), changing the speed of the supply and exhaust fans directly effects the pressure of air input to the rack 200, and in turn, the rate of air changes per hour for each cage 46. Thus, the present invention provides for the monitoring of air flow through the rack 200 (in effect, monitoring the air change per hour rate), and for controlling the environment within the rack 200 and cage 46 by providing a feedback loop between the monitored air flow and a desired air change per hour rate, as entered by a user. The inventive system adjusts the rotational speed of the input fan 12 and exhaust fan 12' (if provided), so that a predetermined (i.e., user selected) air flow or air change per hour rate is maintained.

In the present invention, and with continued reference to FIG. 2, the pressure of air coming into the rack 200, and flowing in the air flow direction indicated by arrow A, is measured downstream of the HEPA filter 16. Measurement at that location is necessary because the filter 16 clogs over time and impedes air flow into the rack 200. The Venturi tube 18 is utilized to condition the air flow in a way which allows the air pressure to be easily and accurately measured just before entering the rack 200 via conduit 34. By measuring the pressure of the air flow at opening 20 and measuring the pressure at opening 22, and creating a pressure differential which can be monitored, the pressure at which air is input into the rack 200 by high pressure fan 12 is accurately determined. In addition, the Venturi tube 18 provides accurate air flow measurement with the need for expensive and sophisticated pressure detectors. Moreover, the present invention enables the use of a simple opening provided in a sidewall of the housing 14 to detect air flow and pressure without introducing a measuring device that may alter air flow through the housing 14 and into the rack 200, thereby impeding the ability to take accurate air flow measurements.

A user of the present invention may store a desired air pressure or a desired air exchange per hour value in a non-volatile memory 72, which may be integral to the microcontroller 60 or provided as a separate component. Alternatively, a plurality of air pressure and air exchange per hour values may be previously stored in memory 72 for a plurality of rack sizes and configurations. A user may then simply select the appropriate rack size and configuration to obtain the desired air pressure and air exchange per hour value. In operation, the microcontroller 60 compares the pressure input from differential pressure circuit 28 with the desired air pressure stored in non-volatile memory 72. If the pressure signal received from the differential pressure circuit is approximately equal to the desired pressure stored in memory 72, then microcontroller 60 does nothing. However, if differential pressure circuit 28 indicates a pressure greater than that stored in non-volatile memory 72, microcontroller 60 will output a signal through fan interface 32 to slow down motor 30 which in effect reduces the air flow (i.e.,. pressure) into the rack 200. On the other hand, if the pressure signal output by differential pressure circuit 28 indicates a pressure less than stored in memory 72, then microcontroller 60 outputs a signal to fan interface 32 to speed up motor 30 increasing the air flow caused by high pressure fan 12. As a result, a constant airflow is maintained through the supply air system 10 and into the rack 200.

Figure 3:
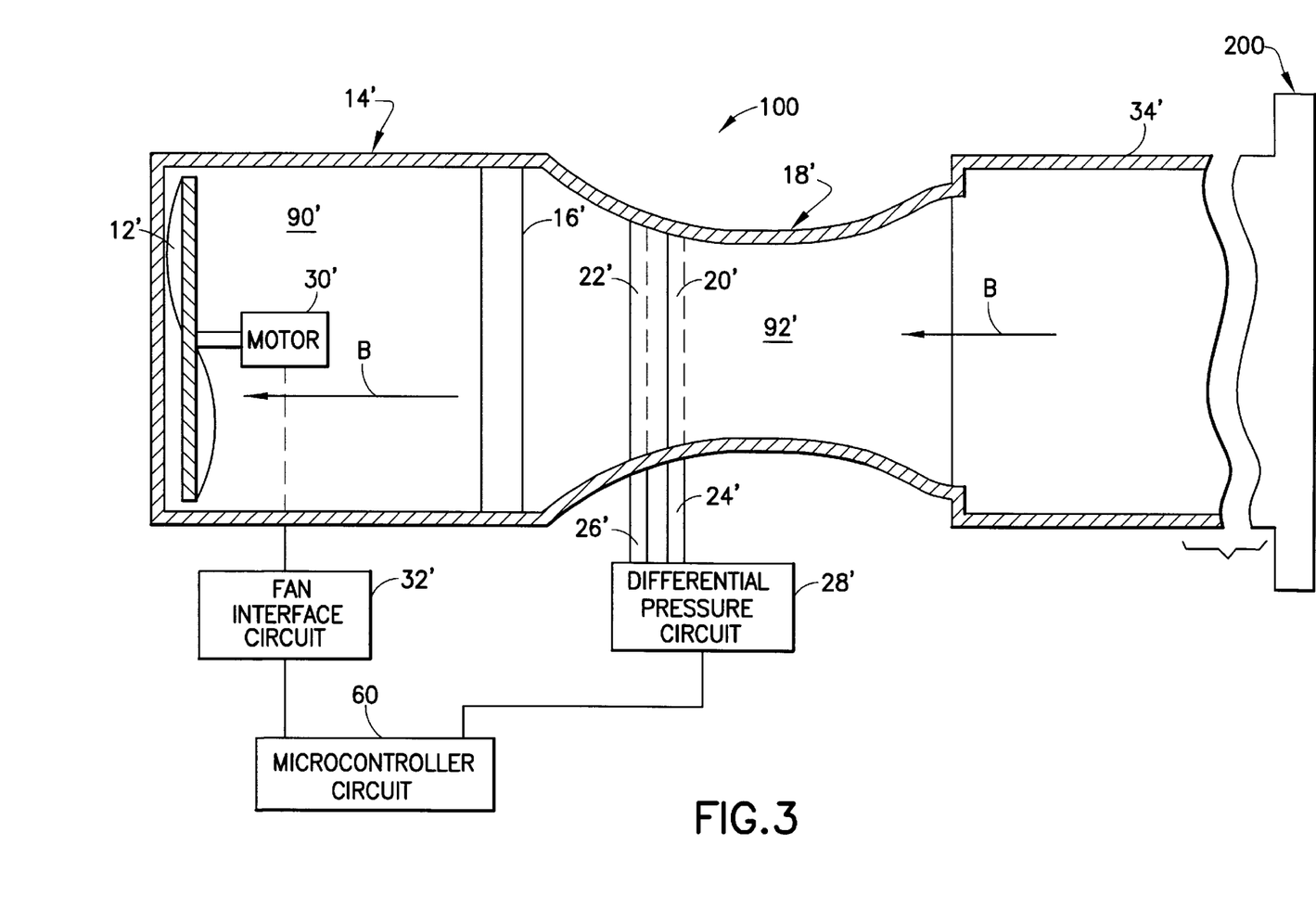
FIG. 3 is a cross-sectional side view of an exhaust air system of the system of FIG. 1 and constructed in accordance with the present invention.

With reference next to FIG. 3, an exhaust air system 100 constructed in accordance with the present invention will now be discussed. At the rack level, the volumetric air flow can also be controlled by controlling the exhaust of the rack utilizing an exhaust air system 100 in accordance with the present invention. The exhaust air system 100 is similar in construction to supply air system 10 and like numerals are utilized to indicate like structure. Exhaust air system 100 also includes a high pressure fan 12' driven by a motor 30' which in turn is controlled by microcontroller 60 through a fan interface 32'. Although FIGS. 2 and 3 indicated a single microcontroller 60, it will be obvious to persons skilled in the art and from the disclosure provided herein that separate microcontrollers may also be provided in accordance with the present invention. A HEPA filter 16' is disposed upstream (in an air flow direction indicated by arrow B) of high pressure fan 12' to filter air leaving the rack 200 to prevent contamination of personnel in the room within which the rack 200 is located.

A unique feature of the present invention is that the Venturi tube serves a dual purpose. For the supply air system 10, it generates a pressure difference from which the flow rate is determined, and it also reduces the airflow down to a dimension that interfaces with the rack. For the exhaust air system 100, the Venturi tube is used to expand the airflow from the rack to the fan. Because a Venturi is a one way device, it cannot be used backwards. Therefore in the exhaust air system 100, a multi-point pitot tube approach is used. This is effective because the expansion section of the Venturi, when used in reverse, helps to the unify cross sectional velocities of the air stream.

Housing 14' again includes a Venturi tube 18' with a constricting section 92' and an exhaust section 90'. The housing 14' (the constricting section 92') connects to the rack

200 via an air plenum or conduit 34. A first multi-point pitot tube 20' is disposed generally in the constricting section 92' of the Venturi tuber 18' and spans the width of that section 92'. A second multi-point pitot tube 22' is also mounted in the proximity of the first pitot tube 20', also spanning the width of the constricting section 92'. The close proximity of the first and second pitot tubers 20', 22' provides a relatively small Venturi, e.g., approximately 2:1 in a preferred embodiment. First pitot tube 20' is coupled to a differential pressure circuit 28' by a tube 24' and second pitot tube 22' is coupled to differential pressure circuit 28' by a tube 26'. Differential pressure circuit 28' is also coupled to microcontroller 60 to provide feedback control of motor 30' and high pressure fan 12'.

Venturi tubes are generally considered one-way devices. A Venturi is created as air is constricted as it flows towards the constricting region as in the direction A of the arrows in FIG. 2, for example. On the other hand, during exhaust in which the air flow is going from constricting to an expanding region, as in FIG. 3, for example, the air accelerates and expands and there is no Venturi effect. The pitot tubes 20', 22' thus measure the dynamic and static pressure of the accelerated air. Therefore, pitot tubes 20', 22' are located downstream (in the air flow direction) of the constricting section 92' and are placed where the Venturi tube 18' is beginning to expand towards high pressure fan 12'. As a result of the expansion and acceleration of the air flow as it passes to the expanding portion of the Venturi tube 18', air flow through the Venturi tube 18' may be uneven.

The multi-point pitot 20', 22' in effect provides pressure samplings across the width of the Venturi tube 18' to average the static and the dynamic pressures within the Venturi tube 18' as the air contracts and thus offset any effects of uneven air flow. The difference between the static pressure and dynamic pressure indicates the volumetric air flow within the Venturi tube 18'. Because the rack 200 is a substantially closed system that recaptures the air input by supply air system 10, the volumetric air flow at exhaust air system 100 can be correlated to the rate of air change within the Venturi tube 18', which may be derived from equation (2):

$$V = \text{sqrt}(2(p_s - p_o)/y) \qquad (2)$$

Where V is the air velocity, y is the specific weight of air, and $p_s - p_o$ is the pressure difference. Additionally, it should be noted that distinct pitot tubes 20', 22' can be formed as an integral unit having openings therealong at different positions to measure dynamic and static pressure. Again, because a desired air exchange rate in the rack 200 correlates to a desired volumetric air flow into and out of the rack 200, a desired value for volumetric air flow, as measured by differential pressure circuit 28', may be stored in non-volatile memory 72. If the differential pressure circuit 28' outputs a signal approximately equal to the stored value in non-volatile memory 72, then the microcontroller 60 provides no output to fan interface 32' (i.e., rotational speed of the fan 12' is unchanged). However, if the differential pressure circuit 28' outputs a signal corresponding to a higher or lower level than stored in the non-volatile memory 72, then microcontroller 60 will output a signal to fan interface 32' to either reduce the speed or increase the speed of motor 30' to reach the desired air flow level. This feedback process will continue until the differential pressure circuit 28' outputs the value stored in non-volatile memory 72, i.e., until air flow through the rack 200 equals the desired, user-selected rate.

Figure 6:
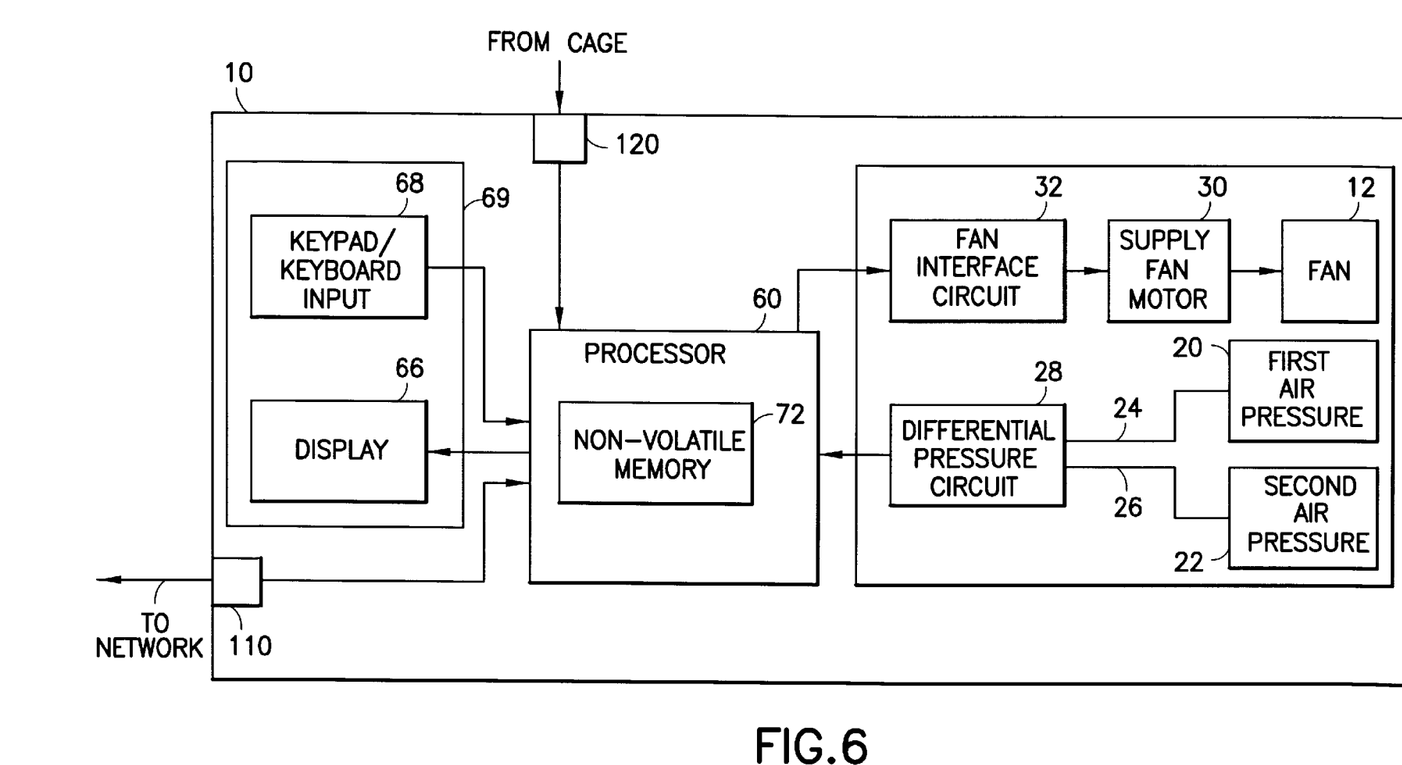
FIG. 6 is a schematic block diagram of the electrical components of the environmental monitoring and controlling system of the present invention.

Referring next to FIG. 6, a schematic block diagram of the components of the supply air system 10 of the present invention will now be discussed. Since the supply air system 10 and exhaust air system 100 are similarly constructed, the exhaust air system 100 will not be discussed in detail with regard to FIG. 6, except where differences exist between the supply and exhaust air systems 10, 100. A control panel 69 is provided via which a user may enter data, change data, view system status, and perform other configuration, calibration, maintenance, etc., operations on the supply air system 10.

The control panel 69 includes a display 66, and a keypad, keyboard or other input device 68. The display 66 provides a visual indication of a variety of data during operation of the supply air system 10. For example, the display 66 may indicate air temperature within the rack 200, airflow, fan performance, filter condition, and other data relating to the operation of the supply air system 10 and its performance in connection with the rack 200. For example, when initially configuring the supply air system 10, the user may select a particular type (i.e., size) rack 200 so that the volume of air to be exchanged is known. The particular types of racks are displayed to the user via the display 66 as the user steps through a menu of choices (using the keypad 68). Via the keypad 68, the user may power the system on and off, page through a plurality of menus providing a plurality of configuration options, and page through the plurality of configuration options and select a desired option.

The display 66 is preferably a liquid crystal display device or dot matrix device, that provides users of the system with a visual means of monitoring operational parameters of the supply air system 10, including, by way of non-limiting example, the actual air changes per hour. In operation, the display 66 receives a signal from microcontroller 60 which causes the display 66 to display the actual air change per hour, or the volumetric flow as measured by differential pressure circuit 28.

If it is desired to adjust or change the rate of volumetric flow and as a result the air change rate within the system, the user can input an instruction through the keypad 68 to microcontroller 60 which will cause a new value for volumetric air flow or air change rate to be stored in non-volatile memory 72. Alternatively, the microcontroller 60 may be factory-programmed with a plurality of data corresponding to a plurality of rack sizes and configurations. Here, a user may page through the options and select the desired pre-programmed value for the particular rack size and configuration. Keypad 68 may also cause the display 66 to be toggled between volumetric flow for the supply air system 10, and air change rate for the supply air system 10.

For the supply air system 10 only, a receptacle 120 is provided via which an electrical connection may be made between the supply air system 10 and cage 46. Although a physical connection (i.e., RJ-45 connectors and wire) are preferred, a wireless connection is also contemplated. When a cage 46 configured in accordance with the present invention is placed in a rack 200, control of the air supply to the rack 200, and air flow through each cage in the rack 200, may be controlled by the configured cage 46. Control signals are communicated by the configured cage 46 over the electrical connection to the supply air system 10 (i.e., the microcontroller 60) to control the operation of the fan 12 based on the measured air flow in the configured cage 46.

The supply air system 10 also provides remote access for operational status and configuration. A network connection 110 is provided via which a remote user (e.g., different room, facility, etc.) can connect to the microcontroller 60 and determine the operational status of the supply air system 10 (e.g., filter status, air flow rate, air change per hour rate, etc.).

The remote user may also configure the supply air system 10, as described herein. Remote access may be via a local area network or the Internet, for example, and may be via a land-based, cellular, or other now known or hereafter developed communication devices and systems.

Figure 4:
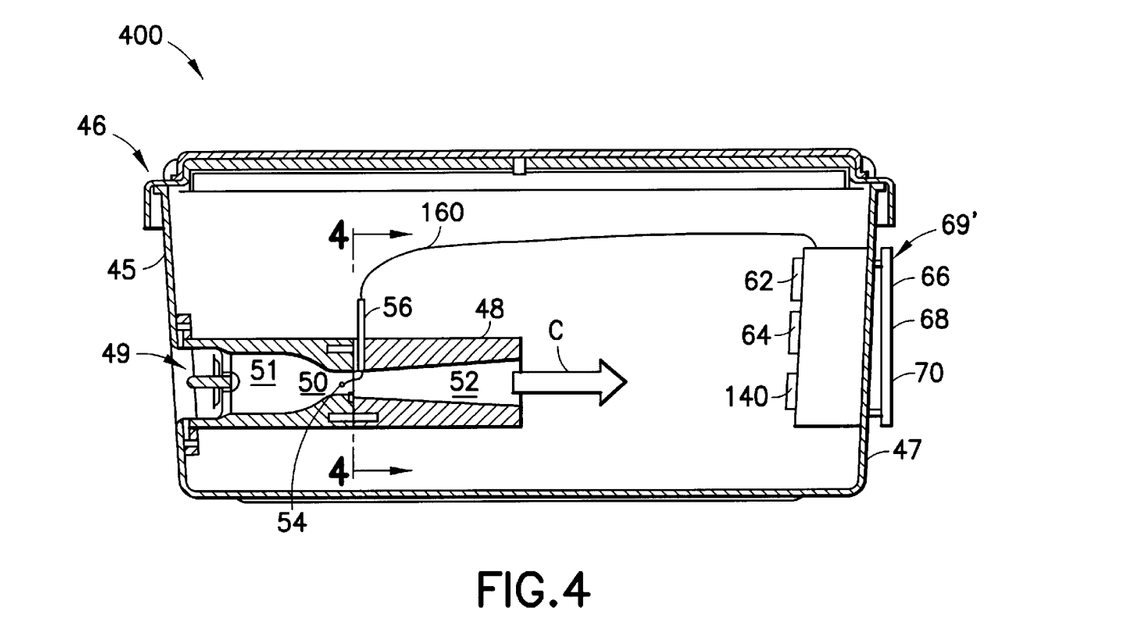
FIG. 4 is a cross-sectional side view of a cage-level system for monitoring and controlling the environment of a cage and constructed in accordance with an embodiment of the present invention.
Figure 5:
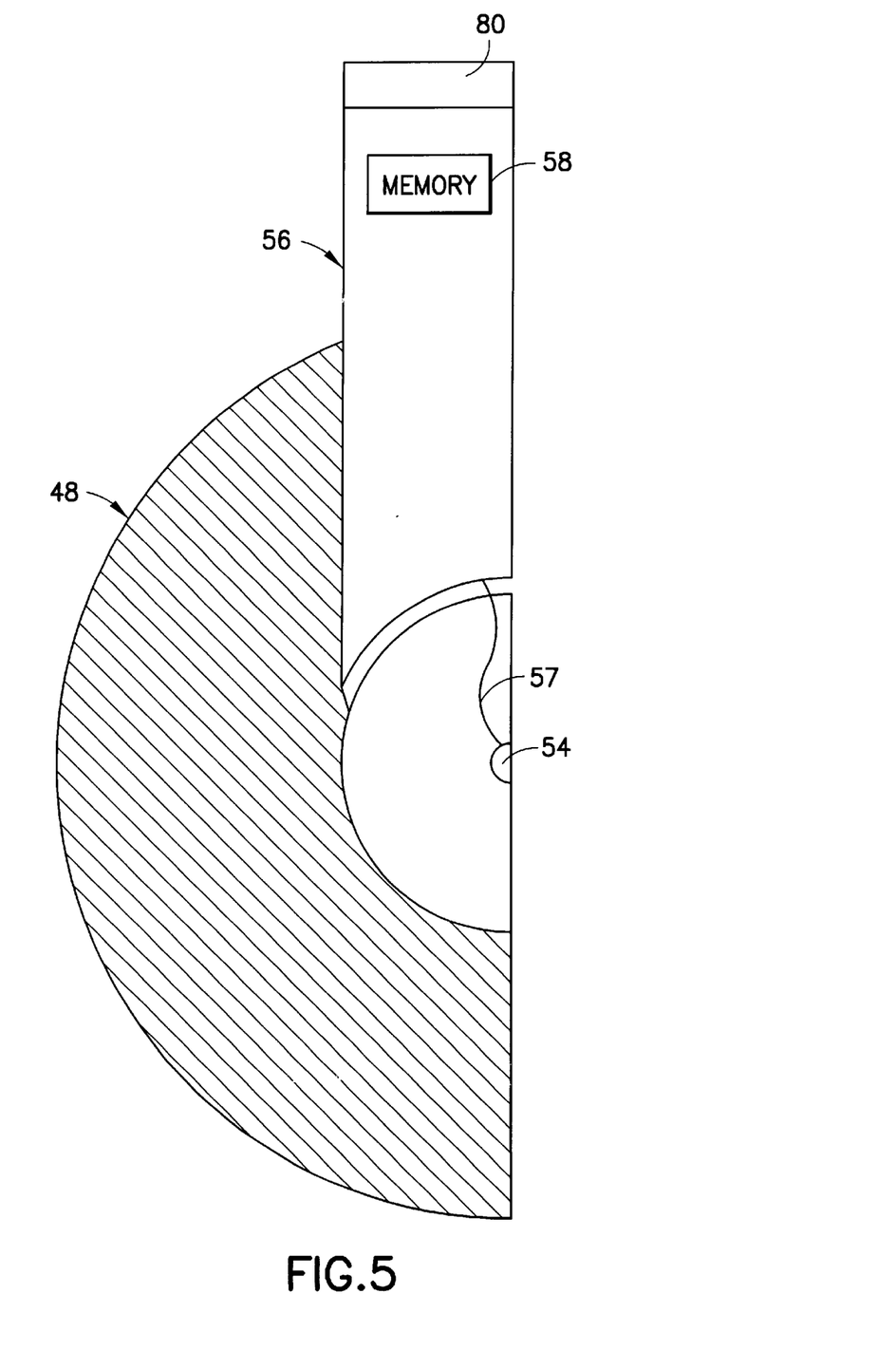
FIG. 5 is a cross-sectional view of the Venturi housing and taken along the line 4—4 of FIG. 4.

With reference next to FIGS. 4 and 5, an embodiment of a cage-level monitoring and control system 400 is there depicted. An animal holding cage 46, as is known in the art, has a rear wall 45 and front wall 47 located in facing opposition to the rear wall 45. An air grommet assembly 49, as is known in the art for coupling the cage 46 with an air supply system of a rack 200, is provided in an aperture defined through the rear wall 45. The cage 46 depicted in FIG. 4, and which is used in connection with the present invention, is a dummy cage in that an animal would not be stored in that cage 46 both for the animal's protection and for protection of the cage-level monitoring and controlling system 400. That cage is also referred to herein as a configured cage 46. A Venturi housing 48 is mounted to the grommet 49 within cage 46 so that air flows through grommet 49 and through Venturi housing 48 in an air flow direction indicated by arrow C. Venturi housing 48 has a constricting region 50 and an expanding region 52. The rate of constriction in constricting region 50 is more dramatic than the more gradual rate of expansion of expanding region 52. A thermistor 54 is disposed at the boundary of constricting region 50 and expanding region 52, i.e., at the narrowest region of Venturi housing 48. Furthermore, thermistor 54 is a bead thermistor having dimensions so as not to interfere with the air flow and to minimize the impedance of the air flow as air enters into and flows through the cage 46. In a preferred embodiment, thermistor 54 is a negative temperature coefficient thermistor. Alternative, a positive temperature coefficient thermistor may be used.

Thermistor 54 is connected by wires 57 (see, e.g., FIG. 5) to a circuit board 56 which includes a non-volatile memory 58, such as EEPROM, and an interface 80 which communicates with the processor 60 via a hardwired connection 160. Circuit board 56 is notched so that no portion of circuit board 56 extends into the air channel defined through Venturi housing 48.

Extremely low pressures of air are typically applied to the cage 46 to minimize turbulence within the cage environment. The direct measurement of pressure in such a low pressure environment would typically be prohibitively expensive. Venturi housing 48 amplifies the flow rate of air entering the cage 46 by causing the air to pass from a first receiving section 51, which has a diameter approximately equal to the diameter of the air grommet 49 (i.e., the air does not encounter any interference or change in flow rate in the receiving section 51), to a constricting section 50, and then to an expanding section 52. Passing air through varying diameters such as those provided in the Venturi tube 48 will cause an increase in the flow rate of the air due to the Venturi effect. This, in effect, increases the signal which is to be detected by the thermistor 54.

Figure 7:
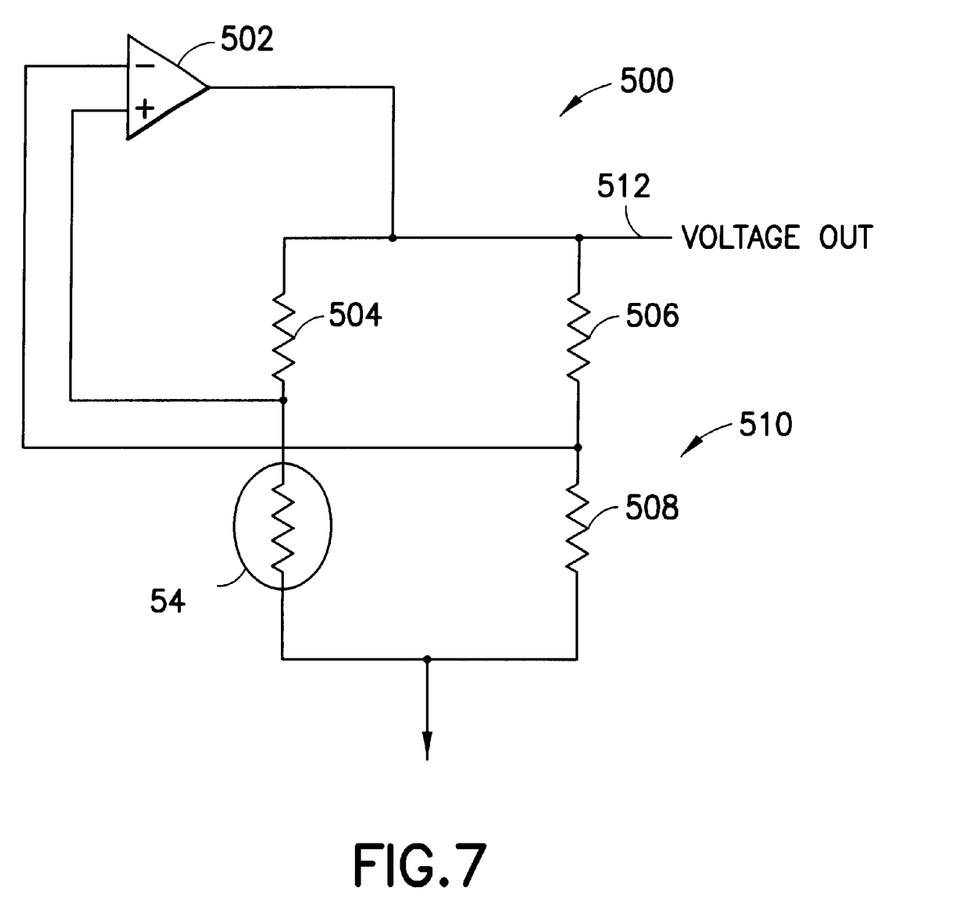
FIG. 7 is a schematic for a circuit used in connection with a thermistor bead in accordance with the present invention.

The Venturi, thermistor 54, and associated electronics are preferably calibrated to a known flow rate. This accounts for variances in the thermistor characteristics (physical dimensions, resistance, etc.) and variances in the Venturi physical dimensions. The thermistor 54 is run in what is call a constant temperature mode. This is accomplished by configuring the thermistor 54 in a wheatstone bridge circuit 510 driven by the output of an op-amp 502, such as in the exemplary circuit 500 depicted in FIG. 7. The circuit 500 is designed to keep thermistor 54 at a constant resistance value, and thus at a constant temperature. It does this in the following way: In a steady state condition, the wheatstone bridge circuit 510 is balanced. The rate of energy being delivered to the thermistor 54 (electrically) is exactly equal to the rate of energy being removed from the thermistor (cooling it). This results in an increase in the thermistor's resistance, which in turn creates an imbalance in the wheatstone bridge circuit 510. The op-amp 502 will rebalance the wheatstone bridge circuit 510 by increasing the voltage output of the op-amp 502 and thus increasing the amount of electrical energy being delivered to the thermistor 54. The voltage output of the op-amp 502 will increase until the wheatstone bridge circuit 510 is re-balanced. The voltage signal output 512 from the circuit 500 is thus a measure of the velocity of the airflow.

A light sensor 62 and a humidity sensor 64 may be mounted in cage 46 to monitor the amount of light and humidity present within the cage 46. Additionally, a second thennistor 140 may be provided for measuring temperature within the cage 46. Each of the light sensor 62, humidity sensor 64, and thermistor 140 may be coupled to a control panel 69' provided with the cage 46 and which may include a microcontroller 60'. The control panel 69' is substantially the same as described above, and thus will not be discussed in further detail here.

During use, thermistor 54 measures the air flow and flow rate of air coming into the cage 46 utilizing hot wire anemometry. Thermistor 54 is heated to a predetermined temperature such as, for example, 120° C. For a given thermistor 54 heated to that temperature, the amount of energy required to maintain the thermistor at 120° C is known. As the air flow flows into the Venturi housing 48 in the air flow direction indicated by arrow C, the air will tend to cool the thermistor 54. This will require an increase in energy to maintain the thermistor at 120° C. By measuring the increased energy required to maintain the temperature of the thermistor 54 at the desired temperature, the cooling effect (air speed, air temperature) of the air flow can be determined. As a result of the application of King's Law (i.e., energy removed from the thermistor bead equals energy provided to the thermistor bead), the air flow rate, and in turn, the volumetric flow rate, can be determined. According to King's Law, energy provided to the thermistor bead equals $V^2/R$, where V is the voltage across the thermistor 54 and R is its resistance. Energy removed from the thermistor bead 54 equals the sum of the conduction loss, convection loss, and radiation lass (which is often negligible). The conduction loss equals $K_1(T_b-T_a)$, where $K_1$ is an empirically determined constant, $T_b$ equals the thermistor bead 54 temperature, and $T_a$ equals the ambient temperature. The convection loss equals $K_2(T_b-T_a)S^q$, where $K_2$ is an empirically determined constant and q is also an empirically determined constant ($1.5<q<2.5$). Knowing the air flow rate, the volumetric flow rate, and an effect, the air changes per hour, at the cage level may be determined.

It should be noted that not all thermistors behave identically. There may be variation in thermistor shape, size, and how much change in resistance will be caused for each thermistor in response to changes in temperature. Therefore, the inventive cage-level monitoring and controlling system 400 is calibrated for the thermistor 54, and possibly for other possible variations. Calibration may be accomplished by measuring the amount of energy being put into the thermistor 54 as a function of the flow rate through the Venturi. Several data points are taken at different flow rates. A least square fit is performed on the data to determine the empirically determined constants mentioned above. The constants are stored in nonvolatile memory 58.

For example, a flow rate of 0.2, 0.4 and 0.6 cubic feet per minute can be put into the Venturi, resulting in voltages of 1.20, 1.45 and 1.67 volts. A least square fit of the data to the equation above will result in values for the constants $K_1$, $K_2$ and q. These constants are then stored in the nonvolatile memory 58.

During use, the cage 46 is in effect a dummy cage and may be placed at any cage location within the rack 200. For certain sizes and configurations, the cage location at which the least desirable air flow or air change per hour rate occurs is known or can be determined. It is preferred to located the configured cage 46 at that least desirable location so that the air flow performance for all other cages in the rack will be at least as good as that of the least desirable location. The microcontroller 60' provided as part of the cage-level system 400 can determine the air flow rate through the cage 46 based on the temperature detected by the thermistor 54. That information may be used to control the operation of the supply air system 10, namely, the rotational speed of the fan 12, so as to control the air flow rate through the rack 200 and, more importantly, through each cage in the rack 200. Thus, the present invention provides for rack-level and cage-level control by monitoring cage-level performance.

Air exchange within a cage 46 also affects the humidity and the temperature within the cage 46. Therefore, feedback control of the supply system fan 12 can also be performed as a function of the sensed humidity levels using the humidity sensor 64 and microcontroller 60' when either the fan has been turned at too great a speed for a predetermined period of time, the humidity or the temperature is greater than a predetermined value as stored in memory 58, or even for preventive maintenance purposes.

For example, microcontroller 60' may include a clock that compares itself with a time interval stored in memory 58 (e.g., every month). If the HEPA filters 16 are to be changed on a monthly basis, then when microcontroller 60 determines that a one month interval has passed, a visual or audio alarm can be given via the display 66.

Although monitoring at both the rack and cage level is continuously desired, in a preferred embodiment, control of the supply air system 10 should only be from either the supply air system sensors 20, 22, or from the cage sensor 54.

A unique feature with the cage 46 unit is its ability to servo the supply air system 10 without any physical connection, including power. This is accomplished by the cage-level system 400 communicating to the supply air system 10 important servo parameters (i.e., air changes per hour) via a radio frequency (rf) link. However, as part of a concept of a completely isolated cage-level system 400, other problems present themselves, in particular supplying power to the system 400. The present invention incorporates several novel methods for allowing a cage-level system 400 to operate for several years on one set of batteries.

One technique involves powering the system 400 by batteries and putting the system 400 to sleep so that the circuitry provided in the cage 46 draws minimal power. The cage-level system 400 will only wake up several times during the day to control parameters in the supply air system 10, if such control is required (i.e., if the cage-level system 400 has detected a change in the air flow rate or air exchange per hour rate). The supply air system 10, which is separately powered, will actively servo the cage-level system 400 based on the latest parameters that were sent to it by the system 400. This method will allow the cage-level system 400 to operate for years on a single set of batteries. When the rack characteristics change very slowly, sampling every few hours will deliver the same level of performance as continuous monitoring.

As used herein, the term microcontroller is used broadly to refer to a microprocessor integrated on a single chip intended to operate as an embedded system. A microcontroller typically contains all the components comprising a controller, including, by way of non-limiting example, a central processing unit (CPU), memory (e.g., RAM, ROM, etc.), input/output ports, and times.

The various circuits provided in accordance with the present invention may be constructed in numerous ways, so long as the functionality of those circuits, as disclosed herein, is provided. For example, the fan interface circuit 32 receives a control signal from the microcontroller 60 that may simply be a signal having a predetermined voltage, with that predetermined voltage controlling the rotational speed of the fan 12. As another example, the differential pressure circuit 28 receives as input, air pressure signals from two separate tubes (e.g., 24, 26). The circuit 28 includes devices for detecting those pressures and converting those detected pressures into corresponding electrical signals, which may be easily compared. From that comparison, the circuit 28 may provide a signal to the microcontroller 60 indicative of the difference (if any) between the detected pressures. It will be obvious to persons skilled in the art, and from the disclosure provided herein, that various combinations of electronic devices (e.g., digital logic devices, resistors, transistors, connectors, etc.) may be provided to carry out the functionality required by the circuits of the present invention.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A system for monitoring and controlling the environment in a rack having a plurality of cages for housing a plurality of laboratory animals, the rack receiving an input air flow through an input conduit, and exhausting an air flow output from an output conduit, said system comprising:

a supply air system coupled to the input conduit for supplying the input air flow to the rack in an input air flow direction, said supply air system comprising:

a pressure differentiator for determining a pressure difference in the input air flow taken at two locations along the input air flow direction, and for providing an indication of said determined pressure difference;

a fan system for generating the input air flow; and a microcontroller for receiving said indication of said determined pressure difference from said pressure differentiator and for controlling the operation of said fan system based on said determined pressure difference so as to maintain a desired rate of input air flow to the rack.

2. A system as recited by claim 1, further comprising:

an exhaust air system coupled to the output conduit for exhausting an air flow output in an exhaust air flow direction, said exhaust air system comprising:

a pressure differentiator for determining a pressure difference in the exhaust air flow taken at two locations along the exhaust air flow direction, and for providing an indication of said determined pressure difference;

a fan system for generating the exhaust air flow; and a microcontroller for receiving said indication of said determined pressure difference from said pressure differentiator and for controlling the operation of said fan system based on said determined pressure difference so as to maintain a desired rate of exhaust air flow from the rack.

3. A system as recited in claim 2, wherein said exhaust air system further comprises:

a housing having a first section with a first diameter and a second section having a second diameter that is greater than said first diameter, said first section being fluidly coupled to the exhaust air conduit of the rack and said second section having an exhaust opening located remote from the first section;

wherein said fan system comprises:

an exhaust fan system including an exhaust fan located in said second section and a fan interface circuit electrically connected to said fan for providing electric control thereof, said fan generating an exhaust air flow from the rack in an exhaust air flow direction;

wherein said pressure differentiator comprises:

a first pressure zone located in said first s section at a position near a junction of said first section and said second section and for detecting a first air pressure in said first section;

a second pressure zone located in said first section at a position downstream in the exhaust air flow direction from said first pressure zone and for detecting a second air pressure in said first section;

a differential pressure circuit fluidly coupled to said first and said second pressure zones for receiving said detected first and second air pressures and for determining a difference therebetween; and wherein said microcontroller comprises:

an exhaust system microcontroller circuit for receiving an electric signal from said exhaust air system differential pressure circuit representing a determined difference between said first and said second air pressures of said exhaust air system, said microcontroller circuit being electrically connected to said exhaust air system fan interface circuit for transmitting an electric signal thereto to control a rotational speed of said fan based on said determined difference between said first and said second air pressures so as to maintain a desired exhaust air flow rate from the rack.

4. A system as recited by claim 3, wherein said first and said second pressure zones of said exhaust air system each comprise a multi-point pitot tube, each oriented transverse to said exhaust air flow direction.

5. A system as recited by claim 3, wherein said first and second section of said housing of said air exhaust system produce a Venturi effect on the air exhaust flow of the air exhaust system.

6. A system as recited by claim 2, wherein each of said supply air system and said exhaust air system microcontroller circuit comprises:

an input device via which a user of said system may select a plurality of operational parameter data for said system, including an air flow rate parameter;

a memory for storing the plurality of operational parameter data for said system; and a processor for receiving input from said input device, and reading and writing said plurality of operational parameter data, and for providing a control output signal to each of said supply air system fan system and said exhaust air system fan system for controlling the respective operation thereof based on said respective determined pressure difference in the input air flow and exhaust air flow and based on said air flow rate parameter selected by the user.

7. A system as recited by claim 1, further comprising:

a cage-level system selectively placeable at one of a plurality of cage locations in the rack for measuring cage-level air flow at the one of a plurality of cage locations, said cage-level system comprising:

a cage having a wall with an aperture defined therethrough and within which is provided an air grommet in for receiving an air flow input to said cage;

an air flow detector for detecting an air flow rate of air flow in said cage; and a microcontroller for receiving from said air flow detector said air flow rate and for communicating with said microcontroller of said supply air system so as to control said fan system of said supply air system based on said detected air flow rate in said cage.

8. A system as recited by claim 7, wherein said air flow detector comprises:

a Venturi tube connected to the air grommet for receiving the air flow input and having an air flow channel defined therethrough and including a first receiving section, a constricting section following said first receiving section, and an expanding section following said constricting section, arranged along an air flow path defined through said Venturi tube, the air flow having an actual air flow rate through said Venturi tube;

a pressure detector located in said air flow channel of said Venturi tube and approximately at a junction between said constricting section and said expanding section for detecting the actual air flow rate through said Venturi tube;

an air flow detection circuit electrically connected to said pressure detector for receiving a signal therefrom indicating the actual air flow through said Venturi tube; and wherein said microcontroller comprises:

a controller having an input device for receiving a desired air flow rate input from a user, said controller receiving from said air flow detection circuit a signal indicating the actual air flow rate through said Venturi tube, said controller determining a difference between the actual air flow rate and the desired air flow rate, said controller communicating with the air flow control system of the rack any difference between the actual air rate and the desired air flow rate.

9. A system as recited by claim 8, wherein said pressure detector is a thermistor.

10. A system as recited by claim 7, wherein said cage-level system further comprises:

a display controlled by said microcontroller and displaying an air flow status of said cage;

a light sensor for detecting a light condition in said cage;

a humidity sensor for detecting a humidity condition in said cage; and a temperature sensor for detecting a temperature in said cage;

said cage-level microcontroller communicating with said supply air system microcontroller so as to control said fan system of said supply air system based on one of said detected air flow rate, humidity condition, and temperature in said cage.

11. A system as recited in claim 1, wherein said supply air system further comprises:
   a housing having a first section with a first diameter and a second section having a second diameter that is less than said first diameter, said second section being fluidly coupled to the input conduit;
   wherein said fan system comprises:
      an input fan system including an input fan located in said first section and a fan interface circuit electrically connected to said fan for providing electric control thereof, said fan generating an input air flow into the rack at an air input flow rate and in an input air flow direction, said second section lesser diameter causing an increase in the air input flow rate;
   wherein said pressure differentiator comprises:
      a first pressure zone located in said first section at a position near a junction of said first section and said second section and for detecting a first air pressure in said first section;
      a second pressure zone located in said second section downstream in the input air flow direction from said first pressure zone and for detecting a second air pressure in said second section;
      a differential pressure circuit coupled to said first and said second pressure zones for receiving said detected first and second air pressures and for determining a difference therebetween; and
   wherein said microcontroller comprises:
      a supply air system microcontroller circuit for receiving an electric signal from said supply air system differential pressure circuit representing a determined difference between said first and said second air pressures of said supply air system, said microcontroller circuit being electrically connected to said supply air system fan interface circuit for transmitting an electric signal thereto to control a rotational speed of said fan based on said determined difference between said first and said second air pressures so as to maintain a desired input air flow rate to the rack.

12. A system as recited by claim 11, wherein said first and said second pressure zones of said supply air system do not substantially affect the air input flow rate.

13. A system as recited by claim 12, wherein said first and said second pressure zones of said supply air system each comprise an aperture defined in a sidewall of said respective first and second sections.

14. A system as recited by claim 11, wherein said first and second section of said housing of said air input system produce a Venturi effect on the air input flow of the air input system.

15. A system for monitoring and controlling the environment in a rack having a plurality of cages for housing a plurality of laboratory animals, the rack receiving an input air flow through an input conduit, and exhausting an air flow output from an output conduit, said system comprising:
   a supply air system for supplying an input air flow into the rack;
   an exhaust air system for exhausting an exhaust air flow from the rack; and
   a cage-level system for monitoring and controlling air flow through a cage and comprising an air flow detector for detecting an air flow rate of air flow in said cage, control of said supply air system being by one of said supply air system and said cage-level system so as to control the input air flow into the rack.

16. A system as recited by claim 15, wherein said supply air system is coupled to an input conduit of the rack for supplying the input air flow to the rack in an input air flow direction, said supply air system comprising:
   a pressure differentiator for determining a pressure difference in the input air flow taken at two locations along the input air flow direction, and for providing an indication of said determined pressure difference;
   a fan system for generating the input air flow; and
   a microcontroller for receiving said indication of said determined pressure difference from said pressure differentiator and for controlling the operation of said fan system based on said determined pressure difference so as to maintain a desired rate of input air flow to the rack.

17. A system as recited by claim 16, wherein said exhaust air system is coupled to an output conduit of the rack system for exhausting the exhaust air flow from the rack in an exhaust air flow direction, said exhaust air system comprising:
   a pressure differentiator for determining a pressure difference in the exhaust air flow taken at two locations along the exhaust air flow direction, and for providing an indication of said determined pressure difference;
   a fan system for generating the exhaust air flow; and
   a microcontroller for receiving said indication of said determined pressure difference from said pressure differentiator and for controlling the operation of said fan system based on said determined pressure difference so as to maintain a desired rate of exhaust air flow from the rack.

18. A system as recited by claim 16, wherein said cage-level system is selectively placeable at one of a plurality of cage locations in the rack for measuring cage-level air flow at the one of a plurality of cage locations, said cage-level system further comprising:
   a cage having a wall with an aperture defined therethrough and within which is provided an air grommet for receiving an air flow input to said cage; and
   a microcontroller for receiving from said air flow detector said air flow rate and for communicating with said microcontroller of said supply air system so as to control said fan system of said supply air system based on said detected air flow rate in said cage.

* * * * *